United States Patent
Ding et al.

(10) Patent No.: US 12,521,745 B2
(45) Date of Patent: Jan. 13, 2026

(54) METHOD AND APPARATUS FOR PULSE GAS DELIVERY WITH PRESSURE CONTROL

(71) Applicant: MKS Inc., Andover, MA (US)

(72) Inventors: Junhua Ding, Boxborough, MA (US); Michael L'Bassi, Sterling, MA (US)

(73) Assignee: MKS Inc., Andover, MA (US)

( * ) Notice: Subject to any disclaimer, the term of this patent is extended or adjusted under 35 U.S.C. 154(b) by 1051 days.

(21) Appl. No.: 17/455,626

(22) Filed: Nov. 18, 2021

(65) Prior Publication Data

US 2022/0161288 A1    May 26, 2022

Related U.S. Application Data

(60) Provisional application No. 63/116,599, filed on Nov. 20, 2020.

(51) Int. Cl.
*B05B 12/06* (2006.01)
*H01L 21/67* (2006.01)

(52) U.S. Cl.
CPC ........ *B05B 12/06* (2013.01); *H01L 21/67017* (2013.01)

(58) Field of Classification Search
CPC .... B05B 12/06; G05D 7/0635; G05D 7/0623; G05D 7/0617; G05D 11/132; G01F 1/86; G01F 1/363; G01F 1/50; G01F 1/42; G01F 1/34; G01F 15/005; G05B 2219/37371; Y10T 137/7761
See application file for complete search history.

(56) References Cited

U.S. PATENT DOCUMENTS

| | | | |
|---|---|---|---|
| 7,979,165 B2 | 7/2011 | Gotoh et al. | |
| 8,499,786 B2 * | 8/2013 | Zolock | G05D 7/0635 137/487 |
| 8,794,261 B2 * | 8/2014 | Watanabe | G05D 7/0647 137/486 |
| 9,557,744 B2 | 1/2017 | Ding | |
| 9,846,074 B2 | 12/2017 | Ding | |
| 10,725,484 B2 | 7/2020 | L'Bassi et al. | |
| 2004/0226507 A1 | 11/2004 | Carpenter et al. | |
| 2006/0124173 A1 * | 6/2006 | An | G05D 7/0635 137/487.5 |

(Continued)

FOREIGN PATENT DOCUMENTS

| | | |
|---|---|---|
| CN | 202690588 U | 1/2013 |
| JP | 02-253315 A | 10/1990 |

(Continued)

OTHER PUBLICATIONS

International Search Report and Written Opinion for Int'l Application No. PCT/US2021/072433 Mailed: Mar. 11, 2022.

*Primary Examiner* — Christopher R Dandridge
(74) *Attorney, Agent, or Firm* — Hamilton, Brook, Smith & Reynolds, P.C.

(57) ABSTRACT

Pulsed gas delivery is obtained with mass flow control using a thermal mass flow sensor and control valve. The controller is augmented for pressure control with a downstream pressure sensor. In separate control modes of operation, the control valve is controlled in response to the flow sensor during pulse gas delivery mode and controlled in response to the downstream pressure sensor during pressure control mode of operation.

17 Claims, 6 Drawing Sheets

(56) References Cited

U.S. PATENT DOCUMENTS

| | | | | |
|---|---|---|---|---|
| 2006/0278276 A1* | 12/2006 | Tanaka | ............... | G01F 25/17 137/487.5 |
| 2007/0186983 A1* | 8/2007 | Ding | ............... | G05D 11/132 137/487.5 |
| 2010/0125424 A1* | 5/2010 | Ding | ............... | G05D 7/0647 702/47 |
| 2011/0108126 A1* | 5/2011 | Monkowski | ............ | F16K 7/14 137/12 |
| 2013/0092257 A1 | 4/2013 | Yasuda et al. | | |
| 2013/0312663 A1 | 11/2013 | Khosla et al. | | |
| 2014/0069527 A1* | 3/2014 | Mudd | ............... | G05D 7/0635 137/487 |
| 2014/0182692 A1 | 7/2014 | Hirata et al. | | |
| 2014/0190579 A1* | 7/2014 | Ding | ............... | G01F 15/005 137/487 |
| 2016/0372348 A1* | 12/2016 | Sawachi | ............ | C23C 16/45561 |
| 2017/0010625 A1* | 1/2017 | Monkowski | ............ | G01F 1/34 |
| 2017/0199529 A1 | 7/2017 | Ping | | |
| 2018/0173249 A1* | 6/2018 | Hayashi | ............ | G05D 7/0635 |
| 2019/0243392 A1* | 8/2019 | Ding | ............... | C23C 16/52 |
| 2021/0173388 A1* | 6/2021 | Takijiri | ............... | G01F 25/10 |

FOREIGN PATENT DOCUMENTS

| | | |
|---|---|---|
| JP | 2004246826 A | 9/2004 |
| KR | 10-2007-0095240 A | 9/2007 |
| TW | 201410911 A | 3/2014 |
| TW | 201941011 A | 10/2019 |
| WO | 2013109443 A1 | 7/2013 |
| WO | 2015123008 A1 | 8/2015 |

\* cited by examiner

IDEAL DELIVERY CYCLE

METHOD AND APPARATUS FOR PULSE GAS DELIVERY WITH PRESSURE CONTROL

RELATED APPLICATION

This application claims the benefit of U.S. Provisional Application No. 63/116,599, filed on Nov. 20, 2020. The entire teachings of the above application are incorporated herein by reference.

BACKGROUND

Semiconductor fabrication processes, such as atomic layer deposition (ALD) processes, can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc.

Pulse gas delivery devices have been developed to deliver a pulsed flow of a gas to semiconductor process tools. Several such devices are described below.

One basic form of pulse gas delivery is illustrated in FIG. 1. Gas flowing through a channel 103 from an input 101 is pulsed by a shutoff valve 102. The shutoff valve is a conventional on/off-type isolation valve that is either fully open or fully closed under control from a host controller 104. Control from the host controller may be through an electrical connection 106, or the electrical input may be to a pilot valve that valves pressurized air to the shutoff valve to open or close the shutoff valve. A pressure controller 108 may be positioned in-line upstream of the shutoff valve.

A simple form of pressure controller is illustrated in FIG. 2. A pressure sensor 202 senses the gas pressure in the channel 103 and provides the sensed pressure to a microprocessor control unit 204. That microprocessor compares the sensed pressure to a pressure set point and, based on the error between the two, controls opening of an adjustable control valve 206. The openness of the control valve in the channel 103 can be controlled in response to the control signal from the microprocessor 204.

The pressure controller maintains the gas pressure delivered through the shutoff valve 102 to the process chamber at a desired setpoint. Pressure in the channel 103 can also be controlled when the shutoff valve 102 is closed by providing leakage through a leakage line 110 to a leak-by line. The leakage line may include a needle valve or orifice 112. With leakage through the line 110, flow through the control valve 206 can be controlled in response to the pressure sensor 202 to maintain the pressure in the channel 103. Some pressure controllers additionally include a flow sensor that may be useful in pressure control. Also, flow peaks and valleys can be useful diagnostic information.

FIG. 3 illustrates another form of pulse delivery system in which the pressure controller of FIG. 1 is replaced with a mass flow controller (MFC) 310. Like the pressure controller of FIG. 2, a mass flow controller includes a control valve to control flow in response to a control signal from a microprocessor control unit within the MFC. However, the MFC relies on a flow sensor rather than a pressure sensor. The flow sensor is typically a thermal flow sensor upstream of the control valve or a pressure based flow sensor downstream of the control valve. The two-way shutoff valve and leakage line of FIG. 1 may be used, or they may be replaced by a three-way isolation valve at 330 that either pulses gas to the process chamber or diverts gas to a divert line 340 under control of the host controller 320. The host controller 320 also communicates with the processor in the MFC 310 to set a flow setpoint such that the MFC 310 maintains a constant flow during the pulse gas delivery process. The host controller 320 controls and switches the downstream isolation valve 330 such that the gas flow is directed to the process chamber or to the diver line in order to deliver gas pulses to the chamber.

A drawback of each of the pulse gas delivery systems of FIGS. 1 and 3 is that pulse accuracy and repeatability are dependent on the speed and reliability of the shutoff valve 102 or 330 that may degrade with age. Further, in each system, gas is always flowing, wasting process gas through the leakage line or divert line.

FIG. 4 illustrates a prior pulse gas delivery device 400 using pressure-based pulse gas delivery. Pressure based mole measurement techniques make use of a pressure (P) vs. time (t) response of a gas introduced into a known volume. Device 400 includes a chamber 450 providing a known volume, a valve 440 located upstream ("$V_{in}$") of the chamber 450, and a valve 445 located downstream ("$V_{out}$") of the chamber 450. Also provided are a pressure sensor 465 positioned at chamber 450 and a temperature sensor 460.

Initially, the device 400 may be charged by opening upstream valve 440, while downstream valve 445 is closed, allowing a flow of gas ($Q_i$) to enter the device to fill the chamber 450 over a period of time ("Charge" period $\Delta t = (t_1 - t_0)$) and a change in pressure to occur. At time $t_1$ and pressure $P_2$, the upstream valve 440 is closed ("Vin CLOSE"). The process then includes a period ($t_2 - t_1$) in which the gas in the chamber 450 is allowed to stabilize to a set point. During this period, pressure and temperature measurements are obtained by pressure sensor 465 and temperature sensor 460. Upon opening of the downstream valve 445 ("Vout OPEN" at time $t_2$), a flow of gas ($Q_o$) exits the device 400 until the valve 345 is closed again ("Vout CLOSE" at time $t_3$), delivering a pulse of gas from the device to a processing tool over a period of time ("Deliver" period $\Delta t = t_3 - t_2$) and a change in pressure ($\Delta P = P_2 - P_1$). The time $t_3$ at which the pulse is ended to obtain delivery of a desired number of moles of gas is determined from the known volume, pressure $P_2$ and temperature of the gas through a rate-of-fall calculation.

The approach illustrated in FIG. 4 has several limitations. The accuracy and repeatability of pulse delivery are dependent on the speed and reliability of the downstream shut-off valve 445. A shut-off valve with a fast response time is desired. If the valve is aging, however, one may need to implement adaptive adjusting, which adds complexity, or one may need to replace the valve, which typically requires an interruption in the process. Often, the pulse shape (e.g., the pulse width) is not as desired or the pulse does not match the desired square wave sufficiently. Further, the need to charge the chamber 350 with a volume of gas requires time. The gas charge time and stabilization time prior to each pulse limit rapid gas delivery cycle time.

However, an advantage of pressure based mole measurement techniques is that they can be applied without knowledge of the specific gas or gas mixture being measured. The gas flow rate, which is derived from a mass balance over the chamber volume and an application of the ideal gas law, is gas independent, relying on the three state variables of pressure (P), temperature (T), and volume (V) to characterize the behavior of the gas being measured.

FIG. 5 illustrates another prior system 500 for mole-based pulse delivery of a gas. A pressure-based MFC 510 is configured for pulse delivery. A host controller 520 communicates with the control unit 505 of the MFC 510 to provide the desired pulse delivery information, such as pulse mole setpoint, pulse on period, pulse off period and number of repeated pulses. To initiate a pulse delivery cycle, the host controller 520 sends a trigger signal to the MFC 510. The MFC 510 includes a control valve 580 (e.g., a proportional control valve) to control flow of gas from a gas source into a flow channel 515. The control unit 505 of the MFC 510 is configured to control flow of gas through the control valve 580 to control gas delivered to a process chamber during the pulse of gas. The control unit 505 controls the flow of gas through the control valve 580 based on feedback from a flow sensor 525, which is provided to measure flow rate (Q) in the flow channel. The flow sensor 525 includes a flow restrictor 570 within the flow channel 515 and upstream and downstream pressure sensors 555 and 565, respectively. The control valve 580 is typically upstream from the restrictor 570 and the pressure sensors. An alternative to the pressure-based flow sensor is a thermal-based flow sensor that would typically be positioned upstream of the control valve. A temperature sensor 560 may also communicate with the control unit 505.

FIG. 6 illustrates pulse delivery in the system of FIG. 5 employing a gas dose defined by the product of ideal square shape flow set point (Q) and deliver time ($\Delta t$). A gas delivery cycle 600 can be specified by a 'pulse-on' period ($t_2-t_1$), a 'pulse-off' period ($t_3-t_2$), a gas dose (e.g., number of moles of gas per pulse), and a number of pulses per cycle. For pulse delivery, the gas mole dose can be defined as: ideal flow set point (Q)×deliver time ($\Delta t = t_2 - t_1$).

A step function delivery of flow as illustrated in FIG. 6 is ideal but unrealistic due to actual sensor and valve time constants. For practical applications, accuracy and repeatability of dose in the required timeframe are the critical objectives. Thus, it is desirable to accurately and repeatability deliver the gas. To this end, one can use an WC's computational capability to calculate and adjust flow rate to deliver the required amount of gas in the specified time. In particular, the MFC can be configured to compute the actual delivered gas dose and regulate it to the targeted pulse gas dose.

An improvement to the pulse MFC controller of FIG. 5 is presented in U.S. Pat. No. 10,649,471 to Ding et al., incorporated herein by reference. As disclosed in that patent, an isolation valve may be coupled to the output of the MFC to make the pulse shape more square or ideal.

SUMMARY

A system that relies on a pressure controller and shut off valve to deliver gas pulses as in FIG. 1 can be upgraded to pulse MFC pulsing of FIG. 5, while maintaining the functions of pressure control, with minimum upgrade using a pulse MFC with integrated pressure control. The resultant system provides substantially improved pulse gas delivery in terms of accuracy, repeatability, and reproducibility and also enables mole based pulsing. Otherwise stringent requirements of the shutoff valve for pulsing with pressure control are reduced since the shutoff valve is no longer required for pulsing.

In a pulse gas delivery system, the advantages of both a pulsed mass flow controller gas delivery system and a pressure controller are obtained with a single integrated controller. In a pulse gas delivery mode of operation, the controller relies on flow rate measured by a flow sensor to control a control valve. In a pressure control mode, the controller relies on pressure measured by a downstream pressure sensor to control the control valve.

A gas delivery system comprises a flow channel, a flow sensor configured to measure flow rate in the flow channel, a control valve configured to control flow of gas in the flow channel and a downstream pressure sensor, downstream of the flow sensor and of the control valve, configured to measure gas pressure in the flow channel. A control unit is configured to receive signals from the flow sensor and from the pressure sensor and to apply a control signal to the control valve. The control unit is configured for separate modes of operation including: (1) a pulse gas delivery mode in which the control unit is configured to initiate a pulse of gas flow by opening the control valve, to terminate the pulse of gas flow by closing the control valve, and to control mass of gas delivered during the pulse based on flow rate measured by the flow sensor and control of the control valve during the pulse and (2) a pressure control mode during which the control unit is configured to control pressure at the pressure sensor based on the pressure measured by the pressure sensor and control of the control valve.

A method of gas delivery comprises providing a flow sensor to measure flow rate in a flow channel, a control valve to control flow of gas in the flow channel, and a downstream pressure sensor, downstream of the flow sensor and the control valve, to measure gas pressure in the flow channel. A control unit controls gas flow through the control valve in separate modes of operation including: (1) a pulse gas delivery mode in which a pulse of gas flow is initiated by opening the control valve and terminated by closing the control valve, the mass of gas delivered during the pulse being controlled based on flow rate measured by the flow sensor and control of the control valve during the pulse and (2) a pressure control mode during which pressure at the pressure sensor is controlled based on pressure measured by the pressure sensor and control of the control valve.

In the pulse gas delivery mode, the number of moles of gas delivered during a pulse may be controlled as a function of measured flow rate, start time at which the pulse of gas flow is initiated and stop time in which the pulse of gas is terminated. Alternatively, the control unit may be configured for time-based delivery with control of gas flow to a flow setpoint.

An isolation valve may be in the flow channel downstream of the pressure sensor. The isolation valve may be opened during the pulse gas delivery mode, so pulse accuracy and repeatability is not affected by condition of the isolation valve. A leakage line may be coupled to the flow channel upstream of the isolation valve or as a divert line at the isolation valve. The isolation valve may be closed during the pressure control mode of operation while gas leaks through the leakage or divert line.

The control unit may be configured to receive a signal from a host controller to switch between pulse gas delivery and the pressure control modes of operation. The system may switch to pressure control mode after completion of the sequence of pulses in the pulse delivery mode. Measured gas pressure may be used for diagnosis in the pulse gas delivery mode, and measured flow rate may be used for diagnosis in the pressure control mode.

The flow sensor may be a thermal flow sensor upstream of the control valve.

The system has particular application to an ALD tool.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 7:
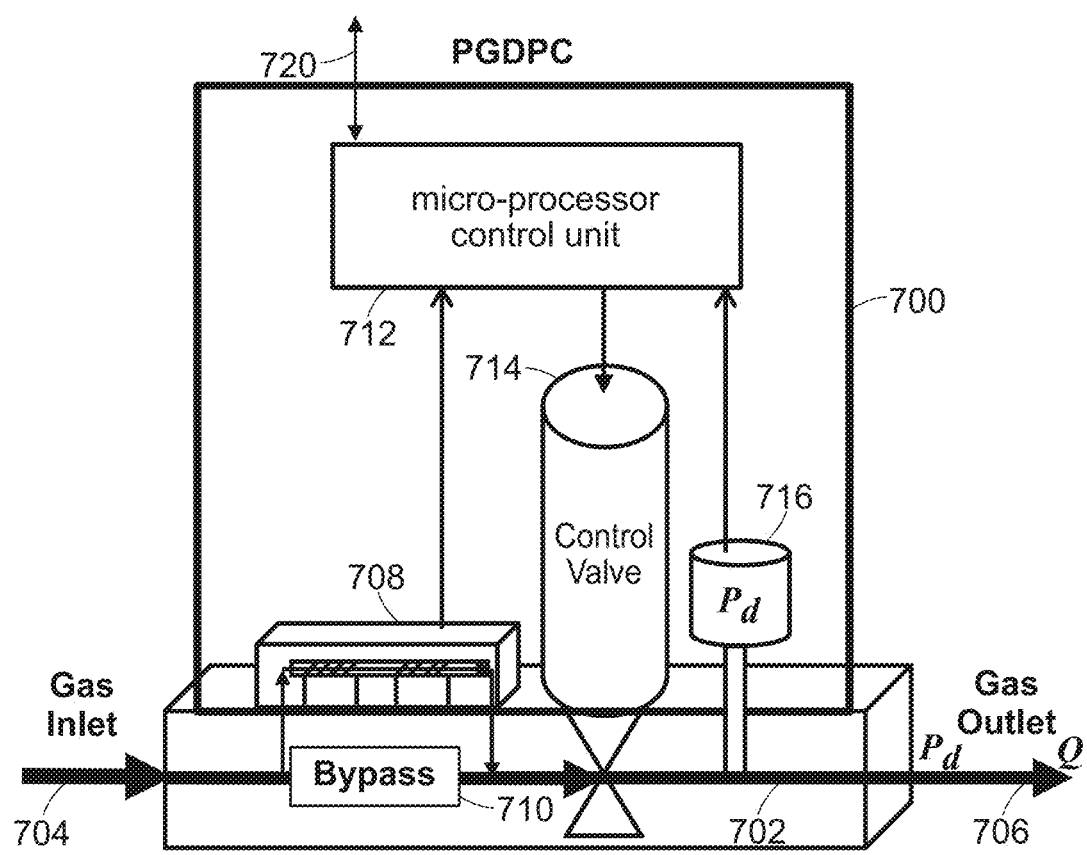
FIG. 7 is an illustration of a pulse gas delivery device with integrated pressure control (PGDPC) in accordance with the present invention.

A pulse gas delivery device with integrated pressure control (PGDPC) is illustrated in FIG. 7. For pulse gas delivery mode of operation, the components of the controller are what would be found in a typical pulsed mass flow controller. A flow channel 702 has a gas inlet 704 and a gas outlet 706. Flow through that channel 702 is measured by a thermal flow sensor 708, which receives a portion of the flow in the channel 702, the remainder flowing through bypass 710. The flow sensed by the flow sensor 708 is provided to a control unit 712 that may be a microprocessor. The control unit 712 compares the sensed flow to a flow setpoint to control the amount by which control valve 714 is opened to obtain the desired flow rate.

For pressure control mode of operation, the controller includes a pressure sensor 716 that measures the downstream pressure in the channel 702 and provides the sensed pressure to the microprocessor control unit. In this mode of operation, the control unit compares the sensed pressure to a pressure set point and controls the amount that the control valve 714 is opened to maintain the desired pressure in the channel 702. The control valve 580 is adjustable, distinct from an on/off isolation valve. The degree of openness of the control valve can be controlled to limit flow and enable control of the flow within the flow channel 515.

Thus, in separate modes of operation, the microprocessor responds to separate sensors to control the common control valve 714. With one integrated device, a system can improve the performance of both pulse gas delivery function and the pressure control function. When the device is in the pulse gas delivery mode, including mole based delivery and time-based delivery, the downstream pressure sensor 716 can provide diagnosis signal for the pulse gas delivery. As the gas pulses are passing through the control valve 714, the downstream pressure sensor 716 can sense the pressure up and down caused by these gas pulses. Users may use this pressure diagnosis signal to monitor the pulse gas delivery performance. When the device is in the pressure control mode, the upstream flow sensor 708 can provide diagnosis signal for the pressure control process. As the control valve 714 controls the flow through the valve, the upstream flow sensor can sense the flow change caused by this pressure control action. Users may use this flow diagnosis signal to monitor the pressure control performance.

Parameters for both the pulse gas delivery and pressure control are downloaded from a host controller through line 720. When the pulse gas delivery sequence is to be delivered, the host controller provides a trigger signal to the microprocessor and the microprocessor carries out the sequence of pulses. Once the trigger signal is received, the microprocessor 712 controls the pulse gas delivery process according to a previously downloaded recipe by turning the control valve 714 on at the start of each pulse, controlling the flow to a targeted flow setpoint by regulating the openness of the control valve, and controlling the flow to zero by closing the valve to end each pulse.

Pulse gas delivery may be as disclosed in prior U.S. Pat. Nos. 10,353,408 and 10,649,471 incorporated herein by reference.

For mole based pulse delivery, a user specifies the following parameters: (1) mole delivery set point (SP), (2) the targeted time length of the pulse-on period, (3) the total pulse on and off period, and (4) the number of pulses (N). Based on this information, the dedicated control unit 712 is configured to automatically adjust the flow set point and/or the pulse-on period to precisely deliver within the targeted pulse-on period the targeted mole amount of gas based on measurements taken by the flow sensor 708, according to the following equation:

$$\Delta n = \int_{t_0}^{t} Q \cdot dt$$

where $\Delta n$ is the number of moles of gas delivered during the pulse-on period (between times $t_0$ and t) and Q is the flow rate measured by sensor 708 over time t during the pulse-on period.

Figure 1:
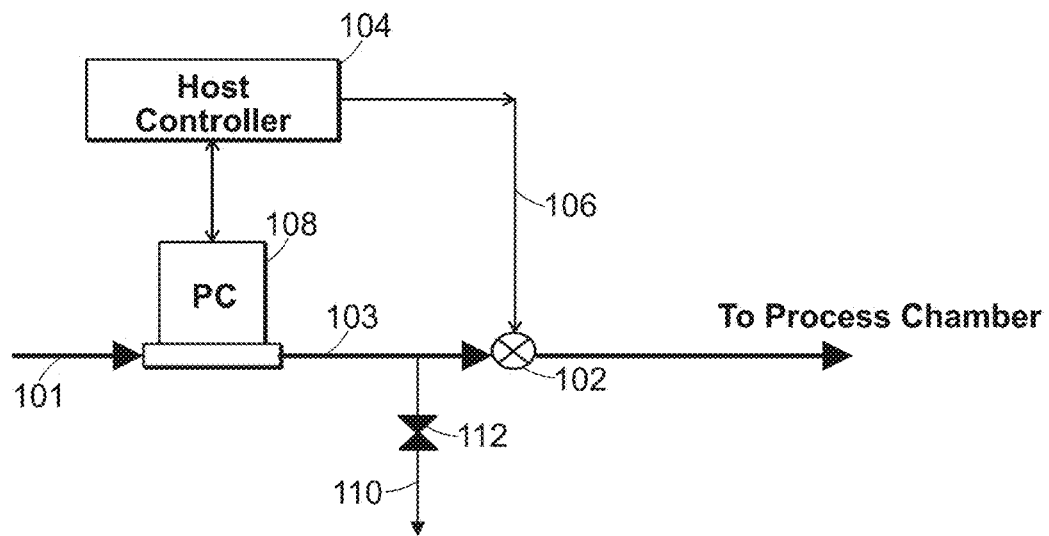
FIG. 1 is a diagram of a prior art pulse gas delivery system in which a pulse is controlled through an on/off valve.
Figure 2:
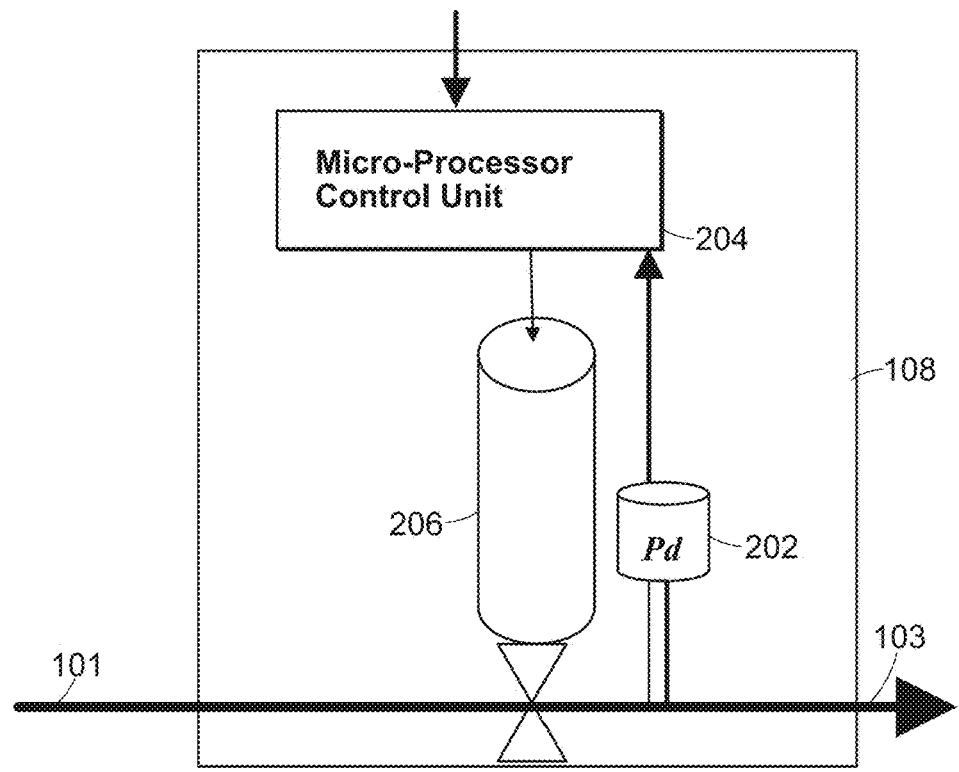
FIG. 2 is an illustration of a pressure controller suitable for use in the system of FIG. 1.
Figure 3:
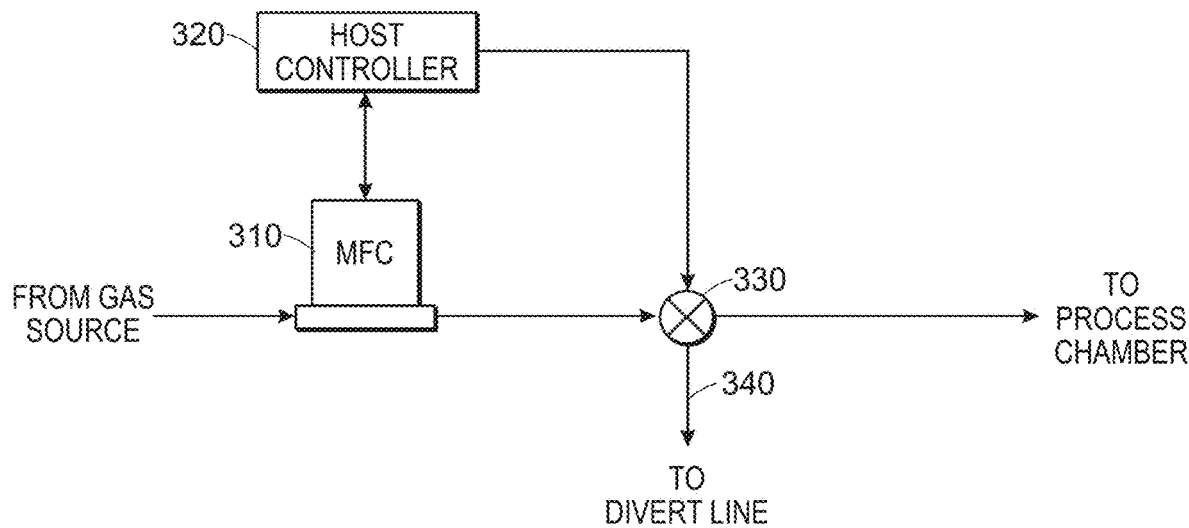
FIG. 3 is a diagram of another prior art pulse gas delivery system that relies on a mass flow controller and an on/off isolation valve.
Figure 4:
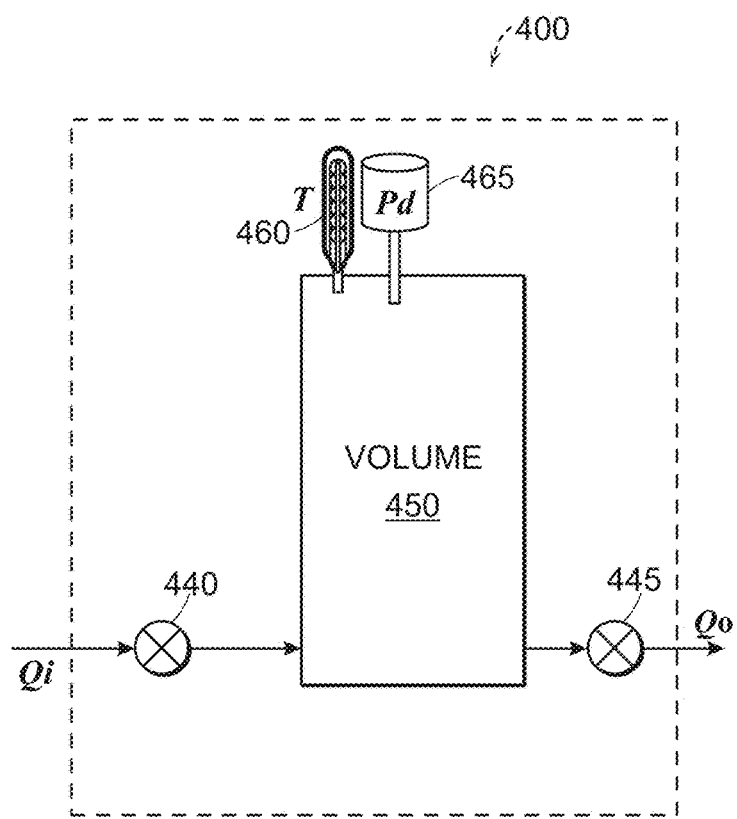
FIG. 4 is an illustration of a prior art rate-of-fall pulse gas delivery system.
Figure 5:
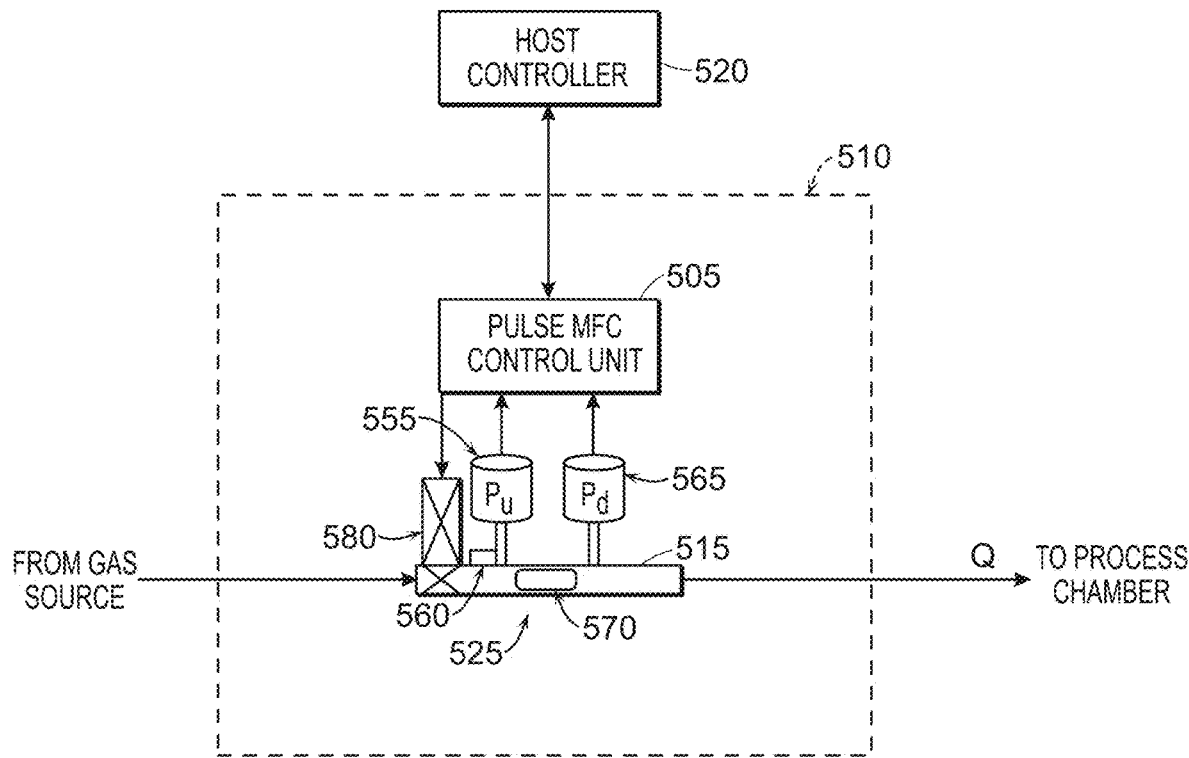
FIG. 5 is an illustration of a prior art pulsed MFC based pulse gas delivery system.
Figure 6:
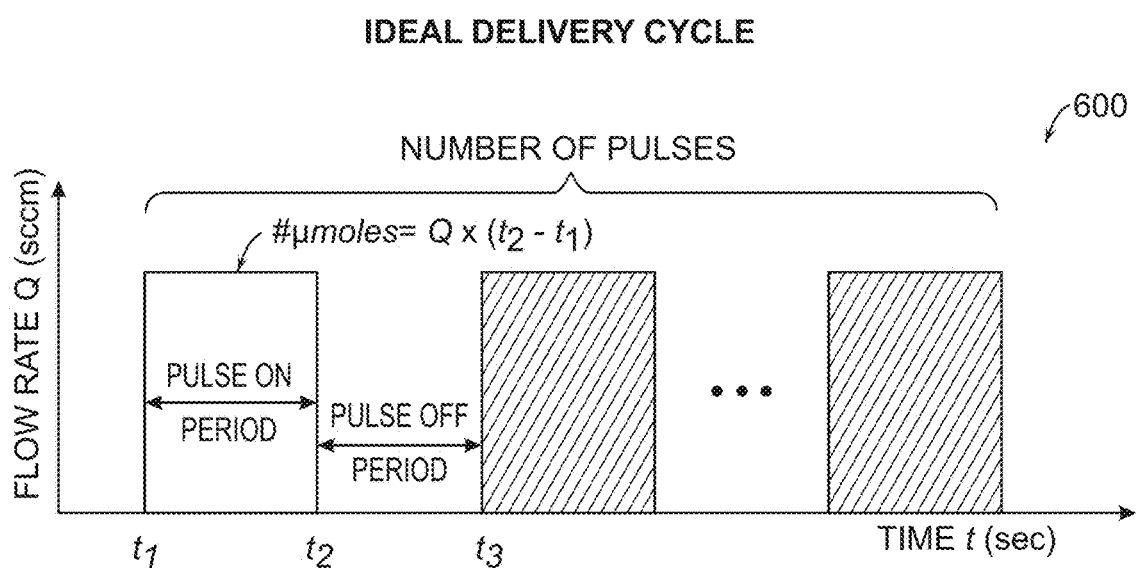
FIG. 6 illustrates a sequence of pulses as delivered by the system of FIG. 5.

Thus, using the mole based pulse delivery mode, the control unit 712 controls, and adjusts as necessary, the flow to control the number of moles delivered with each pulse. Based on these parameters, the device automatically delivers N pulses of flow in a precise timing sequence, with each pulse delivering $\Delta n$ moles during the portion of each total pulse period that the device is on, and turning the device off for the remainder of the total pulse on and off period as illustrated in FIG. 6.

Figure 8A:
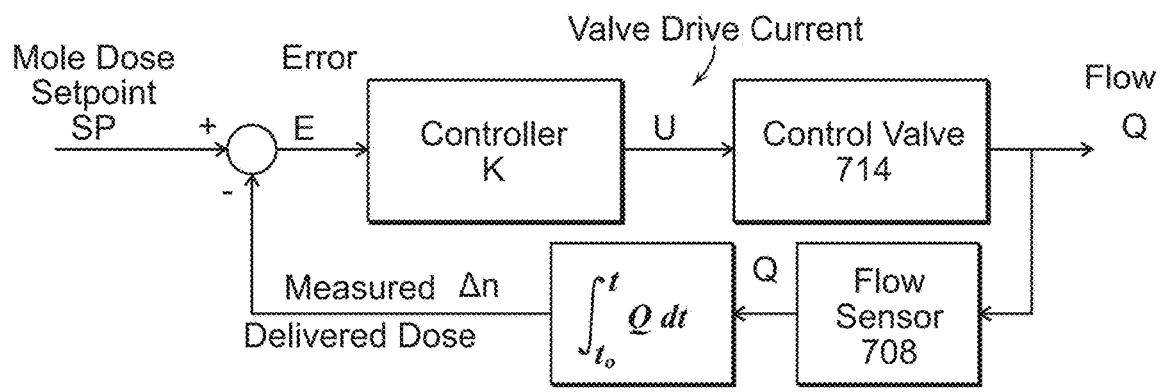
FIG. 8A is a control diagram for the PGDPC of FIG. 7 during a pulse gas delivery mode of operation.

FIG. 8A illustrates a control diagram for the control unit 712 in the mole based pulse delivery mode. Error E is the difference between the mole dose setpoint SP and the measured delivered dose $\Delta n$, which is the integral of measured flow Q:

$$E = SP - \Delta n = SP - \int_{t_0}^{t} Q \, dt$$

Output of the controller K is the manipulated variable U, the valve drive current to the control valve 714. For example, if the controller is a PID controller, then the output of the controller K is $$U = k_p \cdot E + k_i \cdot \int_{-\infty}^{t} E \, dt + k_d \cdot \frac{dE}{dt}$$

where $k_p$ is the proportional control gain, $k_i$ is the integral control gain and $k_d$ is the derivative control gain.

As an alternative to the mole based pulse gas delivery, a time-based pulse gas delivery process may be followed. In the time-based pulse delivery process, the host configures the dedicated control unit 712 with the following parameters for the process that is to be controlled: (1) at least one targeted flow set point ($Q_{sp}$), (2) at least one time-length of the pulse-on period ($T_{on}$), (3) at least one time-length of each pulse-off period ($T_{off}$), and (4) the total number of pulses (N) required to complete the process.

In time-based delivery, the setpoint SP applied to control of FIG. 8A is the flow setpoint, and the error is the difference between the flow setpoint and Q.

Figure 8B:
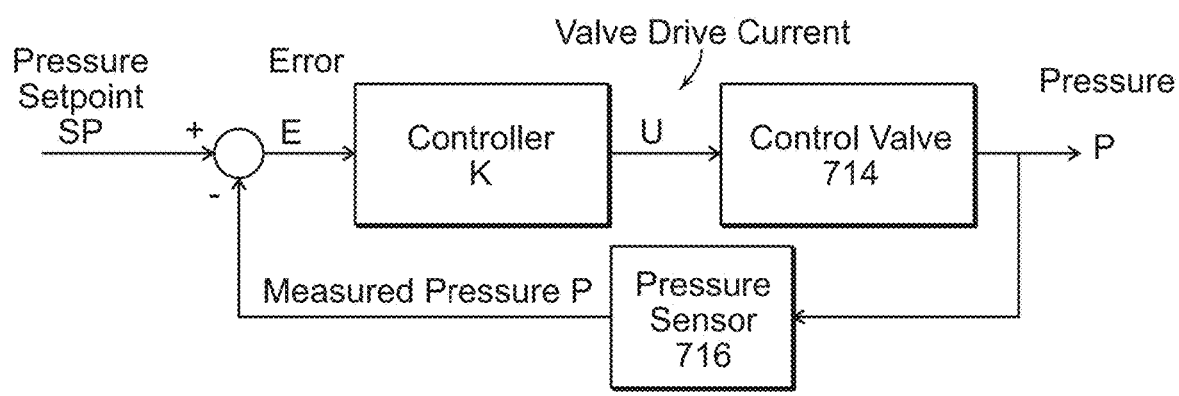
FIG. 8B is a control diagram of the PGDPC of FIG. 7 during a pressure control mode of operation.

FIG. 8B is the control diagram for the control unit 712 during pressure control mode of operation. Here, error is the difference between the pressure set point (SP) and the controlled variable, measured pressure P:

$$E = SP - P$$

The output of the controller K is the manipulated variable U, the valve drive current to the control valve 714. For example, if the controller is a PID controller, then the output of the controller is $$U = k_p \cdot E + k_i \cdot \int_{-\infty}^{t} E \, dt + k_d \cdot \frac{dE}{dt}$$

In typical operation, the PGDPC operates in pressure control mode until triggered by the host controller to enter the pulse gas delivery mode. Although the device could switch to pressure control mode between pulses of the pulse gas delivery, that is generally not required or desirable. After completion of the pulse gas delivery mode through the full sequence of pulses, the device can automatically switch back to pressure control mode.

Figure 9:
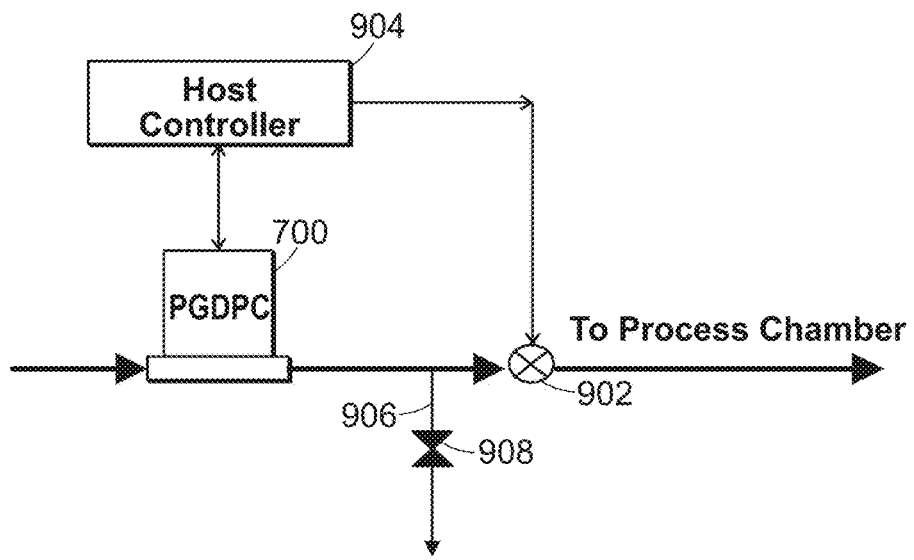
FIG. 9 is an illustration of the PGDPC of FIG. 7 in a system including an on/off valve.

FIG. 9 illustrates the PGDPC 700 of FIG. 7 in a system having a shutoff valve 902, both controlled by a host controller 904. A leakage line 906 having a needle valve or orifice 908 allows for pressure control when the shutoff valve is closed. Control of the shutoff valve (an on/off isolation valve) may be through a direct electrical signal or through a control gas pilot valve. As an alternative to the two-way isolation valve with leakage line, a three-way valve with divert line may be used.

Generally, for pulse gas delivery mode of operation, the host controller 904 signals the shutoff valve 902 to open and then triggers the pulse gas delivery sequence of the PGDPC 700. Although the shutoff valve would typically be closed when the PGDPC is not in pulse gas delivery mode, for diagnostic or other purposes, the shutoff valve may open. During that time, the PGDPC 700 may be configured to operate in a constant flow control mode.

Figure 10:
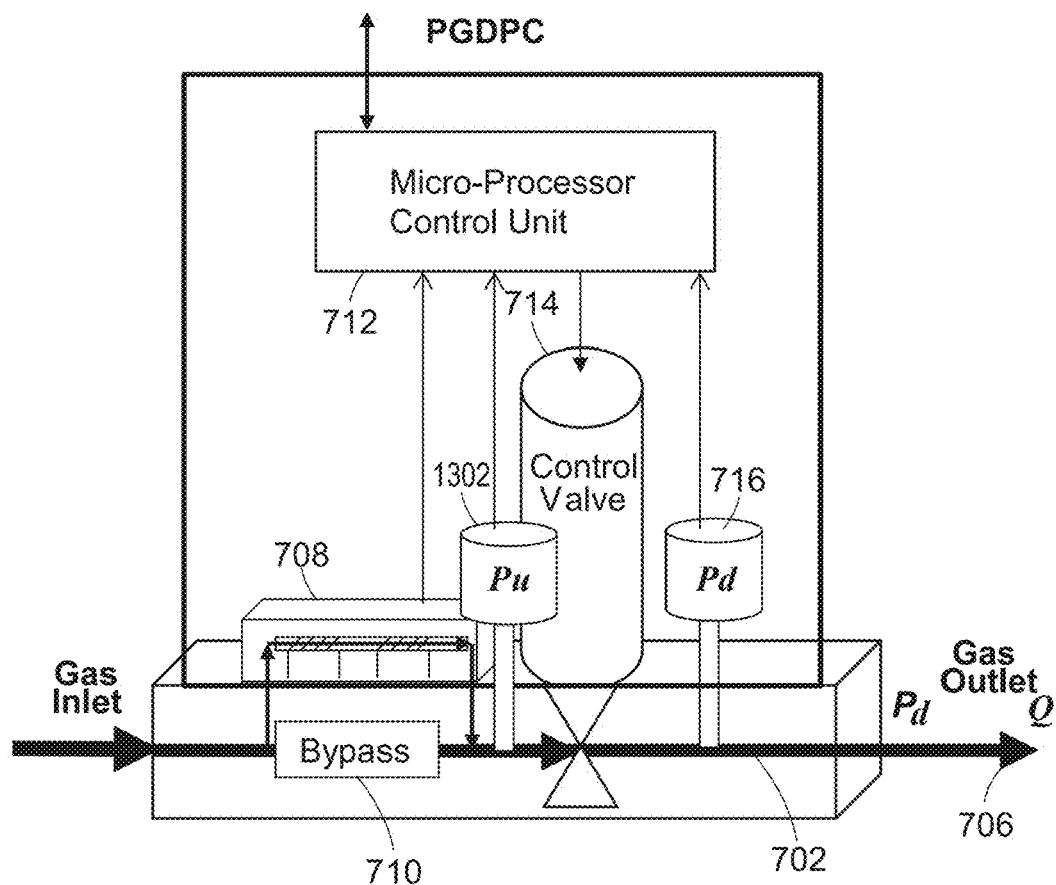
FIG. 10 is an illustration of a modified PGDPC with upstream pressure sensor.

FIG. 10 illustrates a modification of the PGDPC of FIG. 7 that additionally includes an upstream pressure sensor 1302 to provide upstream line pressure and to allow for pressure insensitive flow control for pulse gas delivery.

Although the preferred flow sensor is a thermal flow sensor, a pressure-based flow sensor comprising a flow restriction with upstream and downstream pressure sensors may alternatively be used. With pressure-based flow sensors, the flow sensor is typically downstream of the control valve. That configuration is less preferred since the flow sensor would then isolate the control valve from the downstream pressure sensor during pressure control mode of operation. If a pressure-based flow sensor is used, a downstream pressure sensor of the pressure sensor could also serve as the downstream pressure sensor for pressure control.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A gas delivery system comprising:
   a flow channel;
   a flow sensor configured to measure flow rate in the flow channel;
   a control valve configured to control flow of gas in the flow channel;
   a downstream pressure sensor, downstream of the flow sensor and of the control valve, configured to measure gas pressure in the flow channel; and
   a control unit configured to receive signals from the flow sensor and from the downstream pressure sensor and to apply a control signal to the control valve, the control unit configured to operate in separate modes of operation including:
   a pulse gas delivery mode in which the control unit is configured to initiate a pulse of gas flow by opening the control valve, to terminate the pulse of gas flow by closing the control valve, and to control mass of gas delivered during the pulse based on flow rate measured by the flow sensor and control of the control valve during the pulse,
   a pressure control mode during which the control unit is configured to control pressure at the downstream pressure sensor based on pressure measured by the downstream pressure sensor and control of the control valve; and
   an upstream pressure sensor upstream of the control valve.

2. The gas delivery system of claim 1 wherein, in the pulse gas delivery mode, the number of moles of gas delivered during the pulse is controlled as a function of measured flow rate.

3. The gas delivery system of claim 1 wherein, in the pulse gas delivery mode, the control unit is configured to provide time-based delivery with control of gas flow to a flow setpoint.

4. The gas delivery system of claim 1 further comprising an isolation valve downstream from the pressure sensor.

5. The gas delivery system of claim 4 further comprising a leakage line upstream of the isolation valve.

6. The gas delivery system of claim 1 wherein the control unit is configured to receive a signal from a host controller to switch between pulse gas delivery and pressure control modes of operation.

7. The gas delivery system of claim 1 wherein the flow sensor is a thermal flow sensor upstream of the control valve.

8. The gas delivery system of claim 1 wherein the control unit is configured to use pressure measured with the downstream pressure sensor for diagnosis during the pulse gas delivery mode and to use the measured flow rate for diagnosis during the pressure control mode.

9. A method of gas delivery comprising:
providing a flow sensor to measure flow rate in a flow channel, a control valve to control flow of gas in the flow channel, and a downstream pressure sensor, downstream of the flow sensor and the control valve, to measure gas pressure in the flow channel; and
with a control unit, controlling gas flow through the control valve in separate modes of operation including:
a pulse gas delivery mode in which a pulse of gas flow is initiated by opening the control valve and terminated by closing the control valve, the mass of gas delivered during the pulse being controlled based on flow rate measured by the flow sensor and control of the control valve during the pulse,
a pressure control mode during which pressure at the downstream pressure sensor is controlled based on pressure measured by the downstream pressure sensor and control of the control valve; and
measuring upstream pressure with an upstream pressure sensor upstream of the control valve and providing pressure sensitive flow control based on the measured upstream pressure.

10. The method of claim 9 wherein, during the pulse gas delivery mode, the number of moles of gas delivered during the pulse is controlled as a function of measured flow rate.

11. The method of claim 9 wherein, in the pulse gas delivery mode, the control unit is configured to provide time-based delivery with control of gas flow to a flow setpoint.

12. The method of claim 9 further comprising opening an isolation valve, downstream of the pressure sensor, during the pulse gas delivery mode.

13. The method of claim 12 further comprising, during the pressure control mode of operation, closing the isolation valve and leaking gas through a leakage line upstream of the isolation valve.

14. The method of claim 9 further comprising switching between the pulse gas delivery mode and the pressure mode in response to a signal from a host controller.

15. The method of claim 9 further comprising switching to the pressure control mode after completion of a sequence of pulses in the pulse delivery mode.

16. The method of claim 9 further comprising delivering the gas to an ALD tool.

17. The method of claim 9 wherein measured gas pressure is used for diagnosis in the pulse gas delivery mode and measured flow rate is used for diagnosis in the pressure control mode.

\* \* \* \* \*